(12) United States Patent
Huber et al.

(10) Patent No.: US 6,541,302 B2
(45) Date of Patent: Apr. 1, 2003

(54) METHOD OF FORMING TERMINATION ON CHIP COMPONENTS

(75) Inventors: Johann Huber, Biddeford, ME (US); John Yates Cadwallader, Kennebunk, ME (US)

(73) Assignee: Vishay Sprague, Inc., Sanford, ME (US)

( * ) Notice: Subject to any disclaimer, the term of this patent is extended or adjusted under 35 U.S.C. 154(b) by 3 days.

(21) Appl. No.: 09/758,800

(22) Filed: Jan. 11, 2001

(65) Prior Publication Data

US 2002/0090790 A1 Jul. 11, 2002

(51) Int. Cl.[7] ............................................... H01L 21/44
(52) U.S. Cl. ........................................ 438/106; 438/107
(58) Field of Search ........................... 438/238, 106–127

(56) References Cited

U.S. PATENT DOCUMENTS

| | | |
|---|---|---|
| 4,561,954 A | 12/1985 | Scrantom et al. |
| 4,688,322 A | 8/1987 | Fossey |
| 4,741,077 A | 5/1988 | Langlois |
| 4,859,498 A * | 8/1989 | Yamaguchi ................. 118/500 |
| 5,226,382 A | 7/1993 | Braden |

FOREIGN PATENT DOCUMENTS

DE  19634495 A1  3/1998

OTHER PUBLICATIONS

"Tantalum Breakthrough Doubles Chip Capacitance", Panasonic Matsushita Electroc of Canada. Sep. 11, 1993.
"Small Size Chip Tantalum Solid Electrolytic Capacitor", China. No date available.
"Tantamount. High CV, Sub–miniature Holded Solid Tantalum Chip Capacitor". Sprague The Mark Of Reliability. No date available.

Patent Abstracts of Japan, Application No. 08049684, Application Date: Mar. 7, 1996; Applicant: Murata Mfg. Co. Ltd., Inventor: Ishida Katsuhiko.

Patent Abstracts of Japan, Application No. 04355676; Application Date: Dec. 19, 1992; Applicant: Taiyo Yuden Co. Ltd., Inventor: Fukuyama Junichi.

Patent Abstracts of Japan; Application No. 06053561; Application Date: Mar. 24, 1994; Applicant: Mitsubishi Materials Corp.; Inventor: Yamaguchi Hisashi.

* cited by examiner

Primary Examiner—Jey Tsai
(74) Attorney, Agent, or Firm—McKee, Voorhees & Sease, P.L.C.

(57) ABSTRACT

A method for forming terminations on the opposite ends of a chip component includes placing a chip component in a cavity with one end of the chip component exposed. Termination conductive material is then deposited on the exposed end of the chip component and the component is removed from the cavity and reversed. Termination material is then deposited on the other exposed end. One modification of the invention includes extending the chip components completely through holes in a plate so that the opposite ends of the chip component are exposed. The termination material is then placed on the opposite ends of the chip component.

4 Claims, 3 Drawing Sheets

METHOD OF FORMING TERMINATION ON CHIP COMPONENTS

BACKGROUND OF THE INVENTION

This invention relates to a method of forming terminations on chip components.

Chip components such as tantalum capacitors require termination caps to be formed on the opposite ends of a chip body. Many methods for applying these termination caps include depositing a conductive material on the capacitor by such methods as sputtering, electroplating etc. When these methods are used, it is desirable to mask or shield the central portion of the body between its opposite ends so that it does not include electrically conductive material thereon.

Therefore, a primary object of the present invention is the provision of an improved method of forming terminations on chip components.

A further object of the present invention is the provision of an improved method wherein a chip component body is masked adjacent its central portion during the application of electrically conductive material to the opposite ends of the chip component body forming termination caps.

A further object of the present invention is the provision of a method which can permit the formation of termination caps on a plurality of chip components at once.

A further object of the present invention is the provision of an improved method for forming termination on chip components which is economical in application, results in durable chip components, and is efficient in its operation.

SUMMARY OF THE INVENTION

The foregoing objects may be achieved by taking a chip component having first and second opposite ends requiring terminations, and a central portion between the first and second ends. The chip is inserted into a cavity in a holding member, the cavity having a depth less than the distance between the first and second opposite ends of the chip component whereby the second end and the central portion are within the cavity and the first end is outside the cavity. A first conductive termination is formed on the exterior surface of the first end while at the same time masking the central portion and the second end are masked within the cavity of the holding member from exposure to the conductive termination. The chip is then removed from the cavity and reinserted into the cavity with the first end and the central portion within the cavity and the second end outside the cavity. Then a second conductive termination is formed on the exterior surface of the second end while at the same time central portion and the first end are masked within the cavity of the holding member from exposure to the conductive termination.

Various methods may be used to form the first and second conductive terminations on the chip component. Among these are sputtering, spraying or painting the conductive material on to the first and second ends, dipping the first and second ends respectively in a fluid of conductive material, and electroplating the conductive material on the first and second ends respectively. Other known processes for applying the conductive material to the outer surface of the first and second ends of the chip component may be used without detracting from the invention.

According to another feature of the invention a flexible plate having a hole extending through the plate may be used. The chip component is inserted into the hole with the first and second ends being exposed outside the opposite ends of the hole and with the central portion within the hole. The conductive material is then formed on the first and second ends of the chip component while at the same time masking the central portion from exposure to the conductive material.

This may be done by forming the conductive material simultaneously on both the first and second ends of the chip component or by first forming the conductive material on the first ends and then in a separate operation forming the conductive material on the second ends.

According to another feature of the invention the method may be performed with plates having a plurality of cavities or holes therein to accommodate a plurality of chip components so that the first and second ends of the chip components can all be covered with conductive material as a batch.

DETAILED DESCRIPTION OF THE PREFERRED EMBODIMENT

Figure 1:
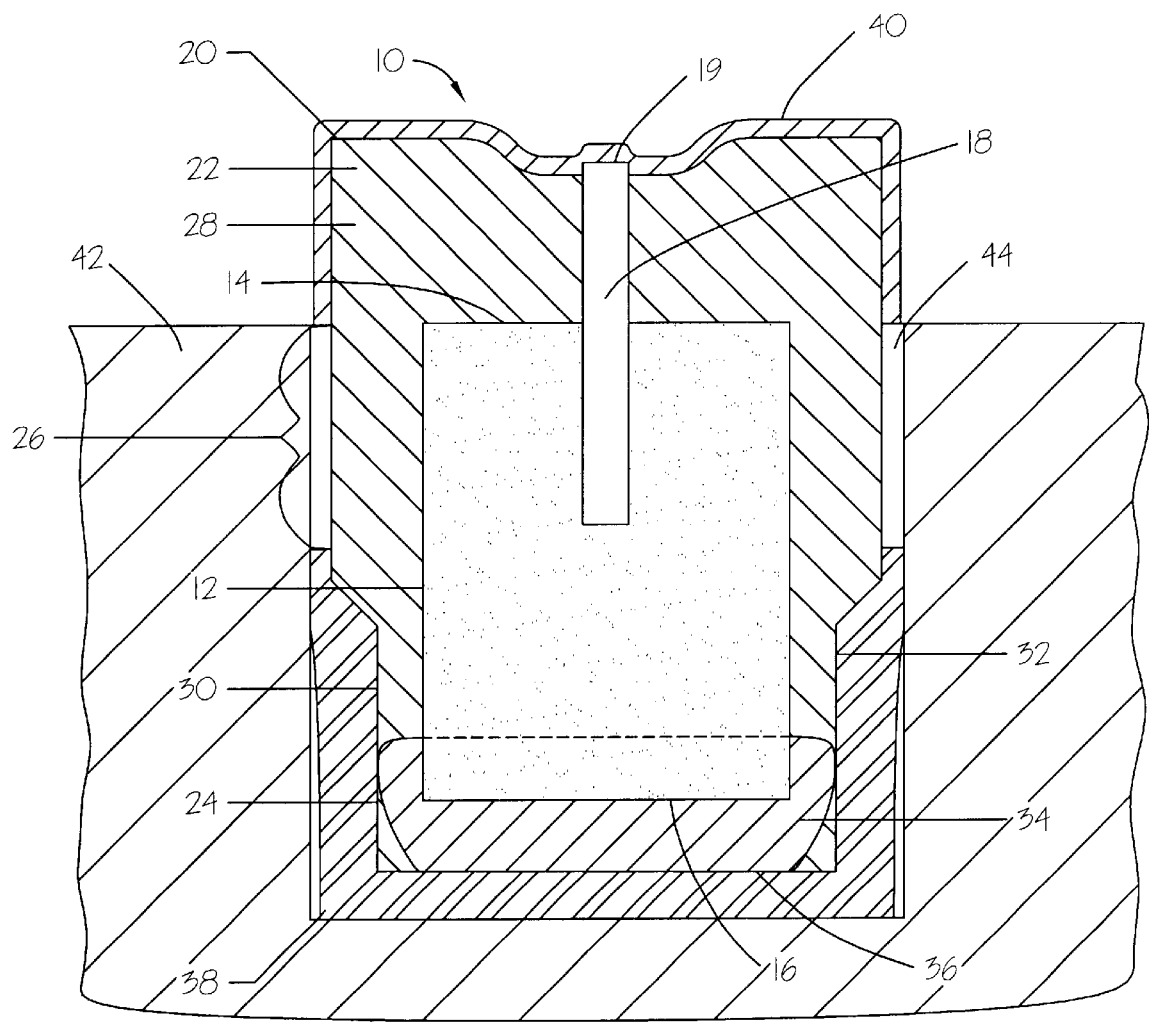
FIG. 1 is a sectional view of a capacitor inserted into a cavity of a plate for use in the present method.

Referring to FIG. 1, the numeral 10 generally designates a capacitor which is inserted into cavity 44 formed in a rigid plate 42. Capacitor 10 includes a pellet 12 having an anode pellet end 14 and a cathode pellet end 16. An anode wire 18 is embedded in and extends from the anode pellet end 14 of pellet 12.

The numeral 20 designates a precut capacitor body having an upper end 22, a lower end 24, and a central portion 26. Precut capacitor body 20 is formed from a protective non conductive outer body 28 having side indentations 30, 32 adjacent its lower ends. A cathode conductor 34 is located at the bottom of the body 28 and surrounds the bottom end of the pellet 12. Cathode conductor 34 includes a flat cathode conductor surface 36 at its lower end and this cathode conductive surface 36 is exposed through the protective outer body 28. Similarly anode wire 18 is exposed through the protective outer body 28 to provide an anode conductive surface 19.

A cathode termination 38 is in covering relation over the lower end 24 of the protective body 28 and an anode termination 40 is formed in covering relation over the upper end 22 of the protective body 28. These terminations 38, 40 can be connected to a circuit board for mounting the capacitor 10 in an electrical circuit. While the method described below is applied to a capacitor, it is also possible to utilize the present method for any type of chip component requiring terminations at its opposite ends.

The method shown in FIG. 1 requires inserting the capacitor body 20 without the terminations 38, 40 thereon into the cavity 44 in the rigid plate 42. The depth of the cavity 44 is chosen so that the portion of the end of each component where the terminations are desired protrudes above the surface of the plate. As shown in FIG. 1 the upper end 22 is exposed above the plate 42.

The protruding portion is then metalized by processes such as vacuum sputtering, painting, spraying, dipping, or electroplating so as to deposit a conductive material on the outer surface of the upper end 22 and thus form anode termination cap 40.

The preferred method is to sputter a very thin film onto the termination areas 38, 40; then to remove the body 20 from the plate 42; and then to build up the thicknesses of the terminations 38, 40, with a separate electroplating step. Also, after loading the body 20 into the plate 42, and before sputtering, it is important to form a plasma etching step under vacuum so as to clean the outer surface of the body 20 for satisfactory electrical and physical adhesion of the sputtered film onto any or all surfaces. After the etching step the outer surface of the dielectric outer body 28 is oxidized by conventionally known techniques. Other methods may be used, but this is the preferred method.

The plate 40 of the present invention has the advantage that the two steps (etching and sputtering) can be performed under a constant vacuum, thus minimizing the risk of contaminating or altering the cleaned surfaces before sputtering. The etching and sputtering steps may also be done in two stages with separate pieces of equipment.

After forming the anode termination cap 40 the component is removed from the cavity 44 and reinserted with the upper end 22 in the bottom of the cavity 44 and with the lower end 24 protruding upwardly above the upper surface of plate 42. The cathode termination 38 is then formed on the exposed lower end 24 of the preformed protective body.

In FIG. 1 the termination cap 38 is shown already applied to the cathode end of the capacitor 10. Either termination cap 38 or termination cap 40 may be applied first, but the size of the cavity 44 should be large enough to accommodate the capacitor 10 with one of the caps 38, 40 thereon.

Figure 3:
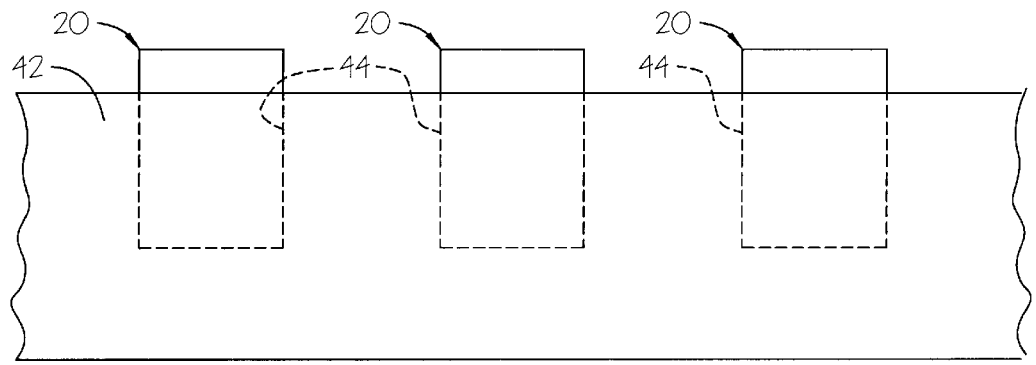
FIG. 3 is a side elevational view of the plate shown in FIG. 1.

Referring to FIG. 3, a plurality of cavities 44 may be formed in the plate 42 so as to accommodate a plurality of the precut capacitor bodies 20. With the use of such a plate it is possible to coat a plurality of bodies 20 at once, then remove the bodies 20 from the cavities, reverse them, and coat them all on the other end with the cathode termination.

Figure 2:
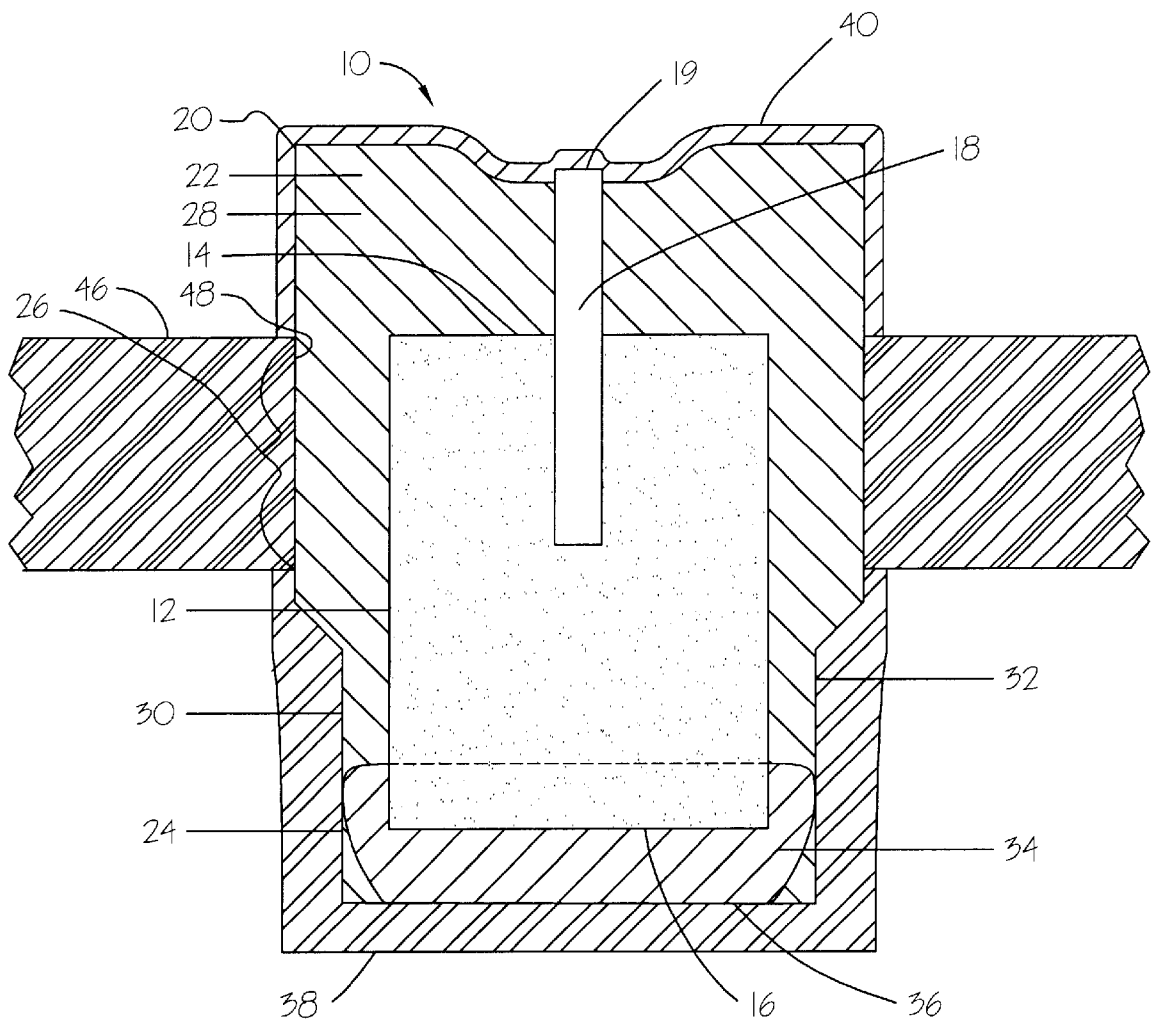
FIG. 2 is a view similar to FIG. 1, but showing an alternative form for the plate in which the capacitor is inserted.
Figure 4:
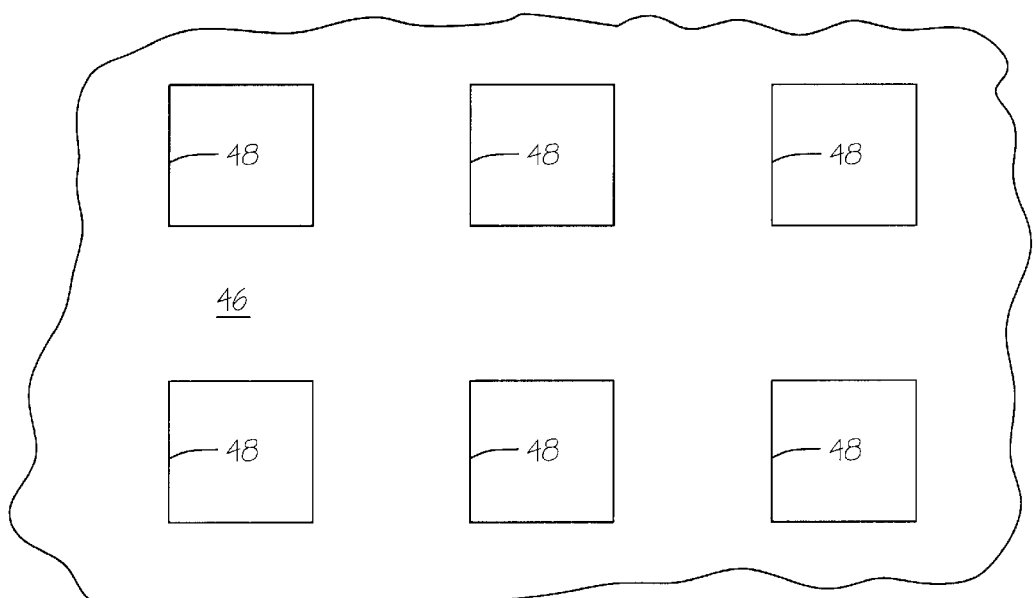
FIG. 4 is a top plan view of the plate used in FIG. 2.
Figure 5:
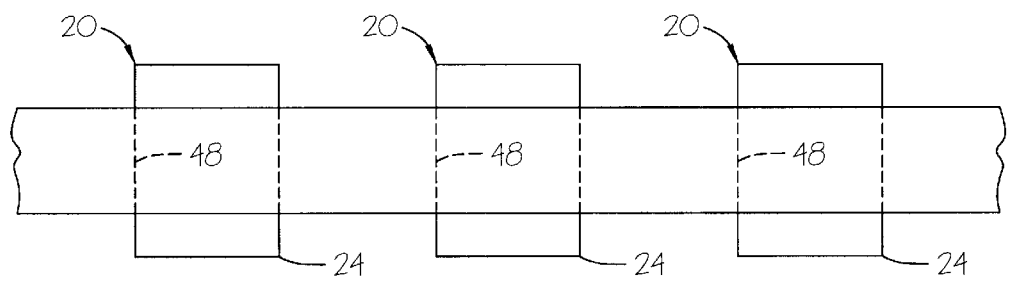
FIG. 5 is a side elevational view of the plate shown in FIG. 2.

Referring to FIGS. 2, 4 and 5, a modified form of the method is shown. In this method, the plate 46 is formed of a flexible material such as rubber or the like and includes holes 48 which extend completely there through and which are sized slightly smaller than the cross-sectional size of the precut capacitor body 20. In this method the precut capacitor body 20 is inserted into the hole 48 with its upper end 22 protruding upwardly from the plate 46 and with its lower end 24 protruding downwardly below the flexible plate 46. The thickness of the plate is chosen so that both ends of the components where terminations are desired protrude.

In this modification of the method, both terminations (the anode termination 40 and the cathode termination 38) may be formed simultaneously by similar means of metalization as described for the method shown in FIG. 1. That method includes cleaning both ends by plasma etching under vacuum, sputtering a thin conductive film on both ends, removing the chips from the plate, and building the final termination thickness with a subsequent plating step. It is also possible to form the anode terminations 40 in a first step and the cathode terminations 16 in a second step.

The length and width of the holes 48 are equal to or slightly smaller than the dimensions of the components inserted into those holes, so that the resilient material will conform to the shape of the components, preventing metalization where terminations are not desired, and also holding the components against slipping in or out of the cavities by gravity.

Thus it can be seen that the foregoing methods accomplish a simple and efficient means for forming termination caps at the opposite ends of chip conductor bodies.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for forming termination on a Chip Component, said chip component having first and second opposite ends requiting termination, and a central portion between said first and second ends said method comprising:

inserting said chip component into a hole extending completely through a plate made completely of a flexible material to a position wherein said first and second ends are outside the opposite ends of said hole and said. central portion is within said hole;

simultaneously forming a conductive material on first and second ends of said chip component while at the same time masking said central portion from exposure to said conductive material.

2. A method according to claim 1 and further comprising inserting a plurality of said chip components each into one of a plurality of said holes in said plate during said inserting step, and simultaneously forming a conductive material on said first and second ends of all of said chip components during said forming step.

3. A method according to claim 1 and further comprising using a flexible material for said plate with said holes being smaller than said chip components, said holes flexing outwardly during said insertion step so as to yieldably hold said chip components in place with said first and second ends of said chip components being outside said holes and so as to retentively grip and mask said central portions of said chip components.

4. A method according to claim 1, wherein said forming step includes a method selected from the group consisting essentially of sputtering conductive material onto said first and second ends respectively, dipping said first and second ends respectively in a fluid of conductive material, and electroplating conductive material on said first and second ends respectively.

* * * * *